United States Patent
Sjolund

(10) Patent No.: US 10,798,911 B2
(45) Date of Patent: Oct. 13, 2020

(54) MILKING ARRANGEMENT, AND A METHOD OF OPERATING A MILKING ARRANGEMENT

(71) Applicant: DeLaval Holding AB, Tumba (SE)

(72) Inventor: Martin Sjolund, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 453 days.

(21) Appl. No.: 15/827,760

(22) Filed: Nov. 30, 2017

(65) Prior Publication Data
US 2018/0153130 A1     Jun. 7, 2018

(30) Foreign Application Priority Data
Dec. 1, 2016  (SE) .................................... 1651583

(51) Int. Cl.
| | |
|---|---|
| *A01J 7/02* | (2006.01) |
| *A01J 5/01* | (2006.01) |
| *A01J 7/00* | (2006.01) |
| *A01J 5/04* | (2006.01) |

(52) U.S. Cl.
CPC . *A01J 7/02* (2013.01); *A01J 5/01* (2013.01); *A01J 5/044* (2013.01); *A01J 7/005* (2013.01)

(58) Field of Classification Search
CPC ...... A01J 7/02; A01J 7/005; A01J 5/01; A01J 5/044
See application file for complete search history.

(56) References Cited

U.S. PATENT DOCUMENTS

| | | | |
|---|---|---|---|
| 2,800,134 A | | 7/1957 | Merritt |
| 4,174,721 A | | 11/1979 | Wuchse |
| 5,080,040 A | * | 1/1992 | van der Lely .......... A01J 5/007 119/14.09 |
| 5,275,124 A | | 1/1994 | van der Lely et al. |
| 5,957,081 A | * | 9/1999 | van der Lely ........ A01J 5/0175 119/14.09 |

(Continued)

FOREIGN PATENT DOCUMENTS

| | | |
|---|---|---|
| GB | 2 030 837 A | 4/1980 |
| SE | 406 028 B | 1/1979 |

OTHER PUBLICATIONS

Swedish Search Report, dated Aug. 31, 2017, from corresponding SE application No. 1651583-5.

*Primary Examiner* — Jessica B Wong
(74) *Attorney, Agent, or Firm* — Nixon & Vanderhye

(57) ABSTRACT

A milking arrangement includes robot milking stations connected to a milk conduit with an outlet end. A connection conduit connected to the outlet end includes an outlet member. A cleaning device for cleaning the milk conduit includes a cleaning conduit having a first connection member. A milk tank includes a second connection member. The outlet member is movable between and connectable to the first connection member in a primary state, and to the second connection member in a secondary state. A controller communicates with the milking stations, the cleaning device and a user interface. When determined to change the state, measures for preparing the arrangement for the change are automatically performed. Thereafter, the user interface indicates to an operator that the arrangement is ready for the change.

20 Claims, 2 Drawing Sheets

(56) References Cited

U.S. PATENT DOCUMENTS

| | | | | |
|---|---|---|---|---|
| 8,925,483 B2* | 1/2015 | Torgerson | ............... | A01J 5/007 |
| | | | | 119/14.08 |
| 10,681,895 B2* | 6/2020 | Sellner | ..................... | A01J 5/01 |
| 2003/0188688 A1 | 10/2003 | Berger et al. | | |
| 2016/0135424 A1 | 5/2016 | Bosma | | |

* cited by examiner

MILKING ARRANGEMENT, AND A METHOD OF OPERATING A MILKING ARRANGEMENT

TECHNICAL FIELD OF THE INVENTION

The present invention refers to a milking arrangement according to the preamble of claim 1. The invention also refers to a method of operating a milking arrangement according to the preamble of claim 13.

BACKGROUND OF THE INVENTION AND PRIOR ART

When animals are to be milked in an automatic milking arrangement, comprising one or more robot milking stations, it is, after a cleaning operation, important to prevent the milk from being mixed with the cleaning liquids that were used during the cleaning operation.

It already exists automatic milking arrangements, in which such mixing is prevented by means of complex solutions comprising a large number valves and drainage outlets. The valves and drainage outlets may be arranged according to the so called block-bleed-block principle. This principle provides for a drainage between two valves for security reasons in case one of the two valves would leak.

However, these large automatic milking arrangements suffer from the disadvantages of the very large number of valves and drainage outlets. Maintenance and trouble-shooting of the milking arrangement are therefore time-consuming and costly.

The whole milking arrangement will have to be shut down when the arrangement is to be maintained, also in the case that only one of the valves is defect.

On the other hand, if the number of valves is to be reduced in such large automatic milking arrangements, there will be a significant increase of manual work in connection with the switching from cleaning to milking, from milking to cleaning and from one milk tank to another.

SUMMARY OF THE INVENTION

The object of the present invention is to remedy the problems discussed above. In particular, it is aimed at a less complex and reliable solution, which may reduce the time and costs for maintenance, but may require some manual work.

This object is achieved by the milking arrangement initially defined, which is characterized in that the controller is configured to receive an order determining that the state is to be changed, the controller is configured to perform automatically measures for preparing the milking arrangement for a change of the state, and the controller is configured to indicate via the user interface to an operator that the measures have been performed and that milking arrangement is ready for the change of the state.

When the user interface provides the information that the milking arrangement is ready for the change of state, the outlet member may be moved from the primary state to the secondary state or from the secondary state to the primary state, or from a first secondary state, supplying milk to one milk tank, to a second secondary state, supplying milk to another milk tank. The moving of the outlet member may be performed manually by the operator.

When the outlet member has been moved, the sensor arrangement may provide the controller of the milking arrangement with information about the changed state, in particular that the outlet member of the connection conduit has been properly connected to the first connection member of the cleaning device or properly connected to the second connection member of the milk tank so that cleaning liquid or milk may be conveyed through the connection conduit to the cleaning device and the milk tank without any risk of leakage. With this information, the controller may initiate cleaning or milking in an automatic manner.

According to an embodiment of the invention, the milking arrangement may be associated with or comprise more than one milk tank. Each milk tank may comprise or be associated with a respective second connection member. The milk tank or milk tanks may be stationary and form a part of the milking arrangement. The milk tank or milk tanks may also be movable, for instance provided on a truck.

According to an embodiment of the invention, the sensor arrangement is configured to sense at least one of a first secondary state and a second secondary state, wherein the first secondary state is when the outlet member is connected to the second connection member of one of the milk tanks and the second secondary state is when the outlet member is connected to the second connection member of another one of the milk tanks.

According to an embodiment of the invention, the sensor arrangement is configured to sense the state and to communicate sensing of one of said primary state and said secondary state to the controller. The controller may, after the state has been changed, notify the operator that the primary state or the secondary state is obtained via the user interface, which for instance may include a mobile phone.

According to an embodiment of the invention, the controller is configured to activate the cleaning device when the primary state is sensed by the sensor arrangement and communicated to the controller. An automatic activation of the cleaning of the robot milking station, or robot milking stations, and the milk conduit may thus be achieved.

According to an embodiment of the invention, the controller is configured to activate the at least one robot milking station, especially the milk pump of the robot milking station, when the secondary state is sensed by the sensor arrangement and communicated to the controller. An automatic activation of the milking by the robot milking station, or robot milking stations, may thus be achieved.

According to an embodiment of the invention, the controller communicates with the milk pump of the at least one robot milking station and is configured to stop the milk pump as a first measure of said measures. Thus no milk will be delivered from the robot milking stations to the milk conduit. Each robot milking station may also comprise a closing valve upstream the milk conduit. The closing valve may be closed in connection with the stopping of the milk pump.

According to an embodiment of the invention, the milking arrangement comprises at least one closing valve, communicating with the controller and provided on the milk conduit downstream the cleaning device and upstream the outlet end, wherein the controller is configured to close the closing valve as a second measure of said measures.

According to an embodiment of the invention, the milking arrangement comprises an evacuating device, communicating with the controller and provided on the milk conduit downstream the closing valve to evacuate the milk conduit, wherein the controller is configured to activate the evacuating device as a third measure of said measures.

According to an embodiment of the invention, the evacuating device is configured to inject a gas or a liquid into the milk conduit in order to evacuate the milk or cleaning liquid in the milk conduit.

According to an embodiment of the invention, the milking arrangement comprises a blocking valve provided on the milk conduit downstream the robot milking stations immediately upstream the outlet end, wherein the controller is configured to close the blocking valve as a fourth measure of said measures.

Various criteria may be used for determining to change from milking to cleaning and from cleaning to milking, for instance after a predetermined period of time, the milk tank is full, one of the robot milking stations is signaling need of cleaning, the milk receiving unit of one or more robot milking stations is full, manual order from the operator, etc.

According to an embodiment of the invention, the outlet member of the connection conduit is manually movable between and connectable to one of the first connection member and the second connection member. The operator my thus move the outlet member manually from the first connection member of the cleaning device to the second connection member of the milk tank or one of the second connection members if there are more than one milk tank. In the same way, the operator may move the outlet member manually from the second connection member or members to the first connection member. Furthermore, the operator may move the outlet member manually from the second conduit of one of the milk tanks to another of the milk tanks.

According to an embodiment of the invention, the connection conduit comprises a hose. The hose may be flexible and permit the operator to move the outlet member even if the milk tank is not exactly positioned.

According to an embodiment of the invention, the connection member comprises pipe. The pipe may be rigid and configured to fit connection of outlet member to the various connection members.

According to an embodiment of the invention, the sensor arrangement comprises an outlet sensor, associated with the outlet member and configured to sense at least one of said primary state and said secondary state. The outlet sensor may be provided on the outlet member. The outlet sensor may be configured to sense when the outlet member is connected to any one of the first connection member and the second connection member or second connection members. More specifically, the outlet sensor may be configured to sense any one of the primary state, the first secondary state and the second secondary state, and which one of the states has been achieved.

The outlet sensor may comprise a proximity sensor of any suitable kind, and, as an alternative or supplement, any suitable reader for sensing for instance unique identification codes of the first and second connection members.

According to an embodiment of the invention, the sensor arrangement comprises a first sensor, associated with the first connection member and configured to sense said primary state. The first sensor may be provided on the first connection member of the cleaning conduit. The first sensor may be configured to sense when the outlet member is properly connected to the first connection member.

According to an embodiment of the invention, the sensor arrangement comprises at least one second sensor, associated with the second connection member and configured to sense said secondary state. The second sensor may be provided on the second connection member of the milk tank.

The second sensor may be configured to sense when the outlet member is properly connected to the second connection member.

More than one second sensor may be provided, wherein one second sensor is provided on each of a plurality of second connection members, each connected to a respective milk tank. One second sensor may then be associated with one of the second connection members and configured to sense the first secondary state. Another second sensor may be associated with another one of the second connection members and configured to sense the second secondary state.

The object is also achieved by the method initially defined, which is characterized by the steps of:

determining that the state is to be changed, automatically performing measures for preparing the milking arrangement for a change of the state, and indicating via the user interface to an operator that the measures have been performed and that milking arrangement is ready for the change of the state.

According to an embodiment of the invention, the method comprises the further steps of:

moving, or manually moving, the outlet member of the connection conduit from one of the first connection member and second the connection member to the other of the first connection member and second the connection member, and sensing at least one of the primary state and the secondary state.

According to an embodiment of the invention, the method comprises the further step of: automatically communicating said primary state or said secondary state to the controller. The controller may communicating the primary or secondary state to an operator via the user interface.

According to an embodiment of the invention, the method comprises the further step of: automatically activating the cleaning device when the primary state is sensed and communicated to the controller.

According to an embodiment of the invention, the method comprises the further step of: automatically activating the at least one robot milking station when the secondary state is sensed and communicated to the controller.

According to an embodiment of the invention, the method comprises the further step of: stopping the milk pump of the at least one robot milking station as a first measure of said measures.

According to an embodiment of the invention, the method comprises the further step of: closing a closing valve, provided on the milk conduit downstream the at least one robot milking station and upstream the outlet end, as a second measure of said measures.

According to an embodiment of the invention, the method comprises the further step of: evacuating the milk conduit as a third measure of said measures.

According to an embodiment of the invention, the method comprises the further step of: closing a blocking valve, provided on the milk conduit downstream the robot milking stations immediately upstream the outlet end, as a fourth measure of said measures.

BRIEF DESCRIPTION OF THE DRAWINGS

The present invention will now be explained more closely by means of a description of various embodiments and with reference to the attached drawings on which FIG. 1 discloses a schematic view of a milking arrangement according to a first embodiment of the invention, and FIG. 2 discloses a schematic view of a milking arrangement according to a second embodiment of the invention.

DETAILED DESCRIPTION OF VARIOUS EMBODIMENTS

Figure 1:
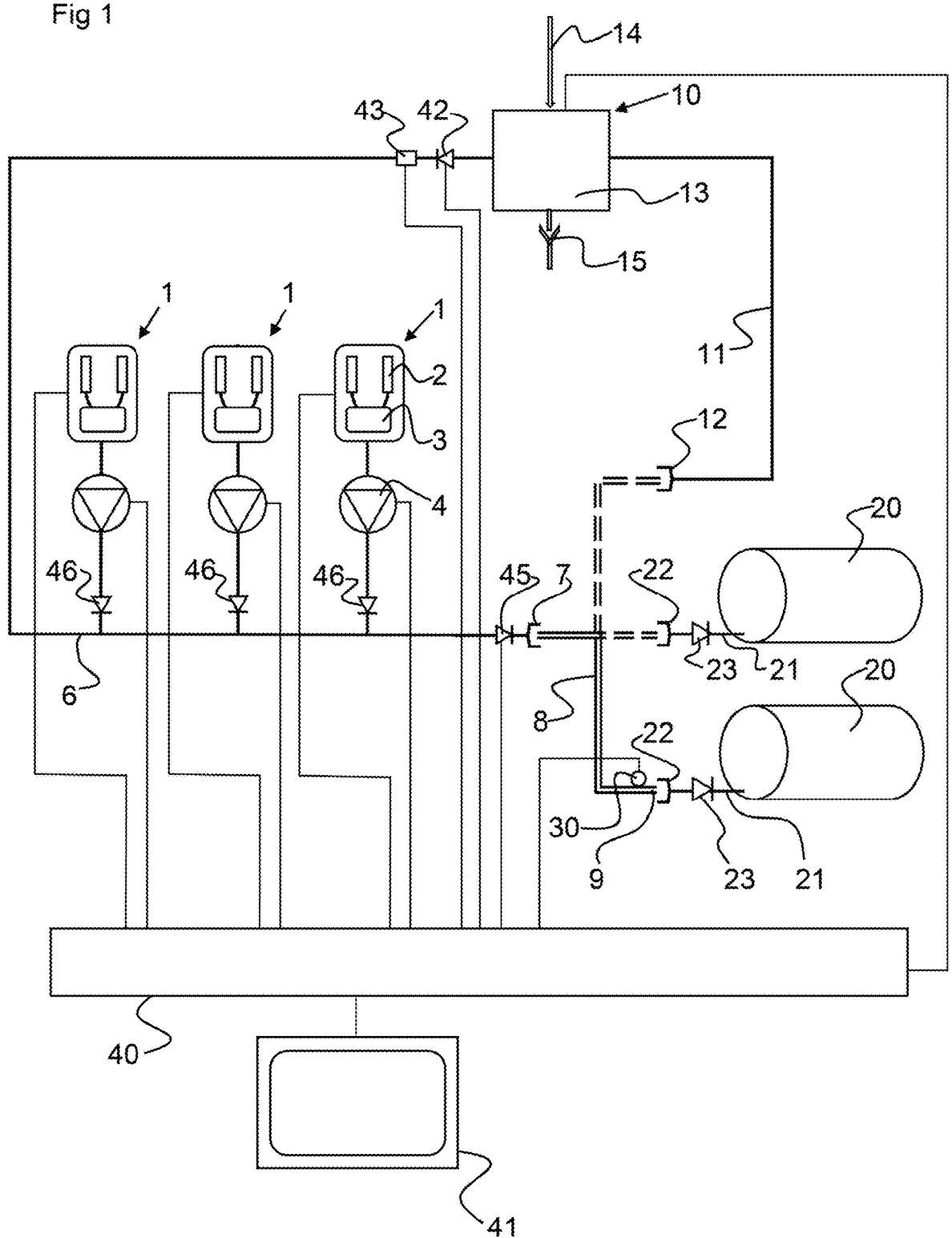

FIG. 1 discloses a first embodiment of a milking arrangement for automatic milking of a plurality of animals. The milking arrangement comprises a plurality of robot milking stations 1. The invention is applicable to a milking arrangement with from only one robot milking station 1 to a very large number of robot milking stations 1. In the embodiment disclosed, three robot milking stations 1 are provided.

Each robot milking station 1 comprises a set of teatcups 2, a milk receiving unit 3, and a milk pump 4. The set of teacups 2 may have four teatcups 2, one for each teat of the animal to be milked. The teatcups 2 are connected to the milk receiving unit 3 for receiving the milk extracted during the milking operation.

The milk pump 4 of each robot milking station 1 is provided downstream the milk receiving unit 3.

Each robot milking station 1 is configured for automatic milking, i.e. for automatic attachment of the teatcups 2 to the teats of the animal to be milked as is known in the art of milking.

The milk pump 4 of each robot milking station 1 is connected to a milk conduit 6 of the milking arrangement as can be seen in FIG. 1. The milk conduit 6 comprises an outlet end 7. The milk conduit 6 may have a significant length.

A connection conduit 8 is connected to the outlet end 7 of the milk conduit 6 via any suitable joining member. The connection conduit 8 comprises an outlet member 9. The connection conduit 8 may comprise, or consist, of a hose, which may be flexible, or a pipe which may be rigid. The hose or the pipe thus may extend between the outlet end 7 of the milk conduit 6 and the outlet member 9 of the connection conduit 8.

The milking arrangement comprises a cleaning device 10, which is configured for cleaning of the milk conduit 6. The cleaning device 10 comprises a cleaning conduit 11 having a first connection member 12. The cleaning conduit 11 is connected to a reservoir 13 for cleaning liquid and water. Cleaning liquid and water may be supplied to the cleaning device 10 via a supply conduit 14 and the reservoir 13. The cleaning conduit 11 continues from the reservoir 13 to each of the robot milking stations 1. Used cleaning liquid may be drained via a drainage 15.

The milking arrangement is associated with or comprises at least one milk tank 20 comprising a second connection member 22. In the embodiments disclosed, two milk tanks 20 are provided, each milk tank 20 having a second connection member 22 connected to the respective milk tank 20 via a respective tank conduit 21.

A valve 23 is provided on the tank conduit 21 to permit closing of the tank conduit 21. The valve 23 prevents milk from leaving the milk tank 20.

As is indicated by dashed lines in FIG. 1, the outlet member 9 of the connection conduit 8 is movable between and connectable to any one of the first connection member 12 and the two second the connection members 22.

The milking arrangement comprises a sensor arrangement 30-32 and a controller 40.

Figure 2:
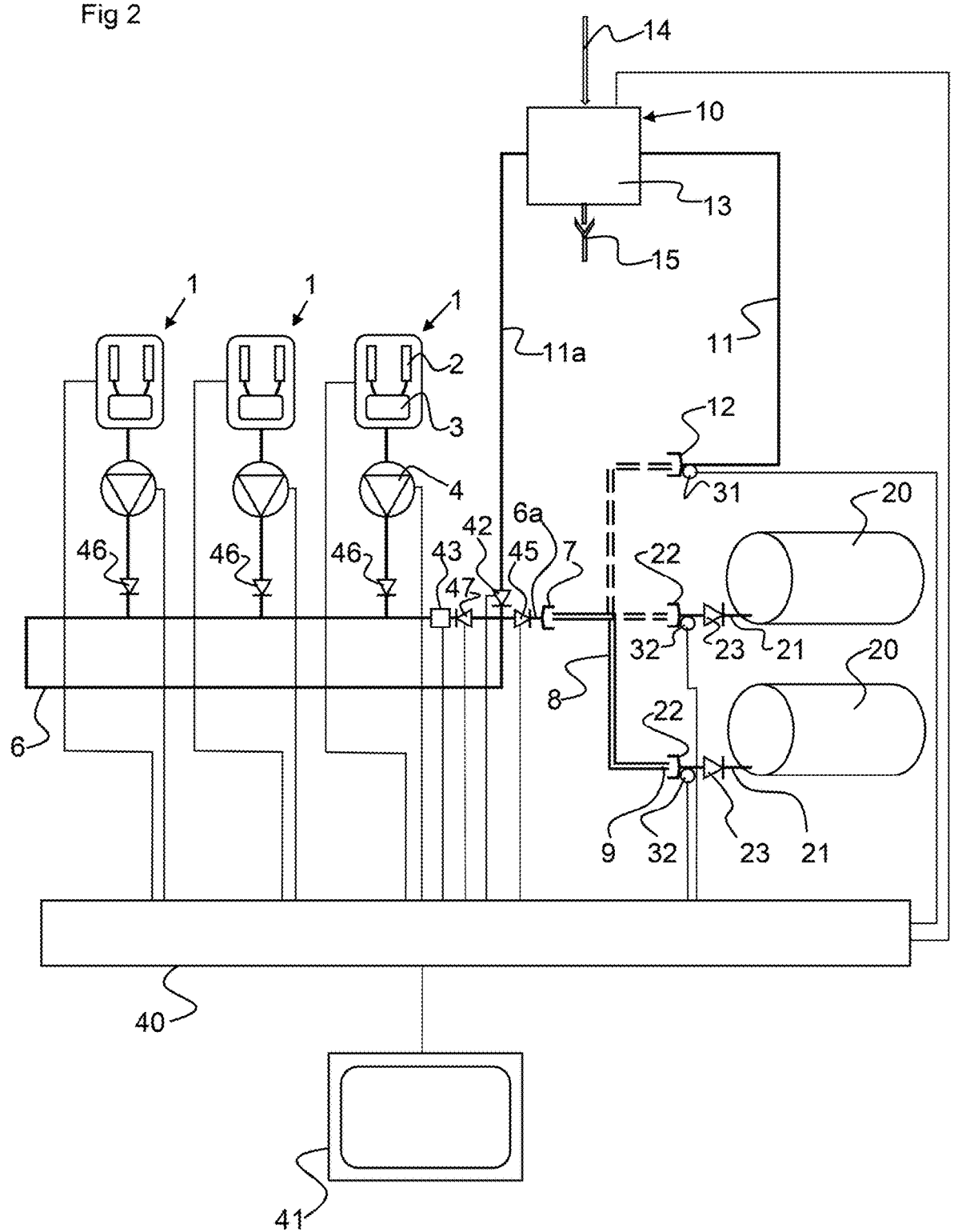

The controller 40 is connected to and communicates with the robot milking stations 1, the milk pump 4 of the robot milk stations 1, the cleaning device 10 and the sensor arrangement 30-32, see also FIG. 2. The communication may be wireless or via suitable lines.

The automatic attachment of the teatcups 2 to the teats of the animal to be milked may thus be initiated by the controller 40 via the communication between the controller 40 and the respective robot milking station 1.

The sensor arrangement 30-32 is configured to sense at least one of a primary state and a secondary state, wherein the primary state is when the outlet member 9 is connected to the first connection member 12, and the secondary state when the outlet member 9 is connected to the second connection member 22.

In the embodiments disclosed, with two milk tanks 20, the sensor arrangement 30-32 may be configured to sense a first secondary state and a second secondary state, wherein the first secondary state is when the outlet member 9 is connected to the second connection member 22 of one of the milk tanks 20 and the second secondary state is when the outlet member 9 is connected to the second connection member 22 of the other one of the milk tanks 20.

The sensor arrangement 30-32 is configured to communicate sensing of the primary state, the first secondary state and the second secondary state to the controller 40 so that the controller 40 receives information about and knows which of the states prevails.

When the controller 40 has received information to the effect that the primary state has been sensed by the sensor arrangement 30-32 and communicated to the controller 40, the milking arrangement is configured to activate the cleaning device 10 via the controller 40. The cleaning of the robot milking stations 1 and the milk conduit 6 may thus be automatically started.

When the controller 40 has received information to the effect that the primary state has been sensed by the sensor arrangement 30-32 and communicated to the controller 40, the milking arrangement is configured to activate the robot milking stations 1, especially the milk pump 4 of the robot milking stations 1, via the controller 40. The milk pump 4 of one or more the robot milking stations 1 may thus be automatically started and milk will be delivered from the local milk receiving units 3 to one of the milk tanks 20 via the milk conduit 6.

The milking of the individual animals may take place even if the milk pumps 4 are stopped, wherein the milk produced is delivered to the local milk receiving unit 3.

The milking arrangement also comprises a user interface 41, a closing valve 42, an evacuating device 43, and a blocking valve 45, which all communicate with the controller 40, and thus may be automatically controlled. The user interface 41 may comprise a screen, such as a touch screen, one or more lamps, one or more LED-lamps, a mobile phone, etc.

The evacuating device 43 may comprises an injector configured to permit injection of a gas or a liquid into the milk conduit 6 in order to force away milk, or liquid, such as cleaning liquid, from the milk conduit 6.

In the embodiments disclosed, the blocking valve 45 is provided on the milk conduit 6 downstream the robot milking stations 1 immediately upstream the outlet end 7. The purpose of the blocking valve 45 is to permit blocking of the milk conduit 6, and prevent milk or any other liquid from reaching and passing the outlet end 7, especially during the moving of the connection conduit 8.

In the first embodiment, the evacuating device 43 is provided on the milk conduit 6 downstream the cleaning device 10 and the closing valve 42, as can be seen in FIG.

1. The closing valve 42 may be provided immediately downstream the cleaning device 10.

Each robot milking station 1 may comprise a check valve permitting a flow in one direction from the respective robot milking station 1 to the milk conduit 6, and preventing a flow in the opposite direction from the milk conduit 6 to the respective robot milking station 1.

The changing from milking to cleaning, from cleaning to milking, or from milking to one of the milk tanks 20 to the other of the milk tanks 20, may be initiated by an order received by the controller 40 determining that the state is to be changed. The order may be initiated after a predetermined period of time, by the fact that the milk tank 20 is full, when one of the robot milking stations 1 is signaling need of cleaning, when the milk receiving unit 3 of one or more robot milking stations 1 is full, after a manual order from the operator, etc.

When it has been decided to make such a change of the state, the controller 40 is configured to perform automatically measures for preparing the milking arrangement for the change of the state. A first measure of said measure may comprise automatically stopping the milk pump 4 of the robot milking stations 1 by means of the controller 40. No more milk or cleaning liquid will thus be delivered into the milk conduit 6, even if the milking of an animal may be continued until the milk receiving unit 3 is full.

A second measure of said measures may comprise automatically closing the closing valve 42 downstream the cleaning device 10.

A third measure of said measures may comprise automatically activating the evacuating device 43 by means of the controller 40 to inject a gas, or a liquid, into the milk conduit 6 so that all milk or cleaning liquid remaining in the milk conduit 6 will be delivered to one of the milk tanks 20 and the cleaning device 10, respectively.

A fourth measure of said measures may comprise automatically closing of the blocking valve 45.

When the measures, or at least one or more of the explained measures, have been performed, the controller 40 communicates to an operator via the user interface 41 that the measures have been performed, and that the milking arrangement thus is prepared for the change of the state and for the moving of the outlet member 9.

The operator may then move the outlet member 9
from the first connection member 12 to one of the second connection members 22,
from one of the second connection members 22 and to the first connection member 12, or
from one of the second connection members 22 to the other of the second connection members 12.

In the first embodiment, the sensor arrangement 30-32 comprises an outlet sensor 30 associated with the outlet member 9. The outlet sensor 30 may be attached to the outlet member 9 of the connection conduit 8. The outlet sensor 30 communicates with the controller 40.

The outlet sensor 30 is configured to sense the primary state and the secondary state, and in particular the primary state, the first secondary state and the second secondary state, and which of the states prevails, and to communicate the prevailing state to the controller 40.

The outlet sensor 30 may comprise a proximity sensor of any suitable kind. Furthermore, the outlet sensor 30 may comprise a suitable reader for sensing a unique identification code of each one of the first connection member 12 and the second connection members 22.

FIG. 2 discloses a second embodiment, which differs from the first embodiment in that the milk conduit 6 runs in a closed loop. The milk conduit 6 comprises an outlet portion 6a, on which one of the blocking valve 42 and the outlet end 7 are provided. The closing valve 42 downstream the cleaning device 10 on an outlet part 11a of the cleaning conduit 11 which is connected to the milk conduit 6. The evacuating device 43 is provided on the loop of the milk conduit 6. A further closing valve 47, which communicates with the controller 40, is provided on the loop of the milk conduit 6 in the proximity to the evacuating device 43 to permit the evacuating device 43 to force the milk in a direction towards the outlet end 7.

In the second embodiment, the third measure may also comprise automatically closing of the further closing valve 47 immediately before the evacuating device 43 is activated.

Furthermore, the sensor arrangement 30-32 of the second embodiment comprises a first sensor 31 and two second sensors 32.

The first sensor 31 is associated with the first connection member 12. The first sensor may be attached to the first connection member 12 of the cleaning conduit 11, and communicates with the controller 40. The first sensor 31 is configured to sense the primary state, i.e. that the outlet member 9 is properly connected to the first connection member 12. The first sensor 31 is configured to communicate the primary state to the controller 40.

The two second sensors 32 are associated with a respective one of the second connection members 22. The second sensors 32 may be attached a respective one of the second connection members 22. The second sensors 32 are configured to sense when the outlet member 9 is properly connected to one of the second connection member 22, and in particular to which one of the second connection member 22.

The second sensors 32 are thus configured to sense the first secondary state and the second secondary state, and to communicate which of these states prevails to the controller 40.

It should be noted that the configuration and extension of the milk conduit 6 may be modified, as well as the position of the different-valves 42, 45, 47, and the evacuating device 43.

The present invention is not limited to the embodiments disclosed, but may be varied and modified within the scope of the following claims.

The invention claimed is:

1. A milking arrangement comprising:
    at least one robot milking station (1) comprising a set of teatcups (2), a milk receiving unit (3), and a milk pump (4);
    a milk conduit (6) to which the at least one robot milking station (1) is connected and which comprises an outlet end (7);
    a connection conduit (8) which is connected to the outlet end (7) of the milk conduit (6) and comprises an outlet member (9);
    a cleaning device (10) configured for cleaning of the milk conduit (6), the cleaning device (10) comprising a cleaning conduit (11) having a first connection member (12);
    the milking arrangement being connectable with at least one milk tank (20) comprising a second connection member (22),
    wherein the outlet member (9) of the connection conduit (8) is movable between different states, including a primary state in which the outlet member (9) is connected to the first connection member (12), and a secondary state in which the outlet member (9) is connected to the second connection member (22);

a sensor arrangement (30-32) configured to sense when the outlet member (9) is in the primary state or to sense when the outlet member (9) is in the secondary state;

a user interface (41); and a controller (40) communicating with the at least one robot milking station (1), the cleaning device (10), the sensor arrangement (30-32) and the user interface (41), wherein, the controller (40) is configured to receive an order determining that a state of the milking arrangement is to be changed, the change of the state of the milking arrangement including a change of state of the outlet member (9) of the connection conduit (8), the controller (40) is configured, upon the controller (40) receiving the order, to perform automatically measures for preparing the milking arrangement for the change of the state of the outlet member (9) of the connection conduit (8), and the controller (40) is configured to indicate via the user interface (41) to an operator that the measures have been performed and that milking arrangement is ready for the change of the state of the outlet member (9) of the connection conduit (8).

2. The milking arrangement according to claim 1, wherein the sensor arrangement (30-32) is configured to sense the state of the outlet member (9) of the connection conduit (8) and to communicate sensing of one of said primary state and said secondary state to the controller (40).

3. The milking arrangement according to claim 2, wherein the controller (40) is configured to activate the cleaning device (10) when the primary state is sensed by the sensor arrangement (30-32) and communicated to the controller (40) and wherein the controller (40) is configured to activate the at least one robot milking station (1) when the secondary state is sensed by the sensor arrangement (30-32) and communicated to the controller (40).

4. The milking arrangement according to claim 1, wherein the controller (40) communicates with the milk pump (4) of the at least one robot milking station (1) and is configured to stop the milk pump (4) as a first measure of said measures when preparing the milking arrangement for the change of the state to a cleaning operation.

5. The milking arrangement according to claim 1, wherein the milking arrangement comprises a closing valve (42), communicating with the controller (40) and provided on the milk conduit (6) downstream the at least one robot milking station (1) and upstream the outlet end (7), and wherein the controller (40) is configured to close the closing valve (42) as a second measure of said measures when preparing the milking arrangement for the change of the state to a milking operation.

6. The milking arrangement according to claim 1, wherein the milking arrangement comprises an evacuating device (43), communicating with the controller (40) and provided on the milk conduit (6) downstream the closing valve (42) to evacuate the milk conduit (6), and wherein the controller (40) is configured to activate the evacuating device as a third measure of said measures when preparing the milking arrangement for the change of the state to a milking operation.

7. The milking arrangement according to claim 1, wherein the milking arrangement comprises a blocking valve (45) provided on the milk conduit (6) downstream the robot milking stations (1) immediately upstream the outlet end (7), and wherein the controller (40) is configured to close the blocking valve (45) as a fourth measure of said measures during moving the outlet member (9) of the connection conduit (8) from one of the first connection member (12) and second the connection member (22) to the other of the first connection member (12) and second the connection member (22).

8. The milking arrangement according to claim 1, wherein the outlet member (9) of the connection conduit (8) is manually movable between and connectable to one of the first connection member (12) and the second connection member (22).

9. The milking arrangement according to claim 1, wherein the sensor arrangement (30-32) comprises an outlet sensor (30), associated with the outlet member (9) and configured to sense at least one of said primary state and said secondary state.

10. The milking arrangement according to claim 1, wherein the sensor arrangement (30-32) comprises a first sensor (31), associated with the first connection member (12) and configured to sense said primary state, and at least one second sensor (32), associated with the second connection member (32) and configured to sense said secondary state.

11. A method of operating milking arrangement comprising at least one robot milking station (1) comprising a set of teatcups (2), a milk receiving unit (3), and a milk pump (4), a milk conduit (6) to which the at least one robot milking station (1) is connected and which comprises an outlet end (7), a connection conduit (8) which is connected to the outlet end (7) of the milk conduit (6) and comprises a outlet member (9), a cleaning device (10) configured for cleaning of at least the milk conduit (6) and the at least one milking station (1), the cleaning device (10) comprising a cleaning conduit (11) having a first connection member (12), and at least one milk tank (20) comprising a second connection member (22), and a sensor arrangement (30-32), a user interface (41), and a controller (40) communicating with the at least one robot milking station (1), the cleaning device (10), the sensor arrangement (30-32), and the user interface (41), wherein the outlet member (9) of the connection conduit (8) is movable between different states, including a primary state in which the outlet member (9) is connected to the first connection member (12), and a secondary state in which the outlet member (9) is connected to the second connection member (22), and the sensor arrangement (30-32) is configured to sense when the outlet member (9) is in the primary state and when the outlet member (9) is in the secondary state, the method comprising the steps of:

the controller (40) determining, via an order, that the state of the milking arrangement is to be changed, the change of the state of the milking arrangement including a change of state of the outlet member (9) of the connection conduit (8);

the controller (40), upon determining that the state of the milking arrangement is to be changed, automatically performing measures for preparing the milking arrangement for the change of the state of the outlet member (9) of the connection conduit (8); and the controller (40) indicating via the user interface (41) to an operator that the measures have been performed and that the milking arrangement is ready for the change of the state of the outlet member (9) of the connection conduit (8).

12. The method according to claim 11, comprising the further steps of:
   upon the controller (40) indicating via the user interface (41) to the operator that the measures have been performed and that the milking arrangement is ready for the change of the state of the outlet member (9) of the connection conduit (8), moving the outlet member (9) of the connection conduit (8) from one of the first connection member (12) and second the connection member (22) to the other of the first connection member (12) and second the connection member (22), and
   upon completion of the moving step, sensing at least one of the primary state and the secondary state.

13. The method according to claim 12, comprising the further step of:
   automatically communicating sensing of said primary state or said secondary state to the controller (40) and the controller (40) beginning operation of the milking arrangement in the changed state.

14. The method according to claim 13, comprising the further step of:
   after said step of automatically communicating said primary state or said secondary state to the controller (40), automatically activating the cleaning device (10) when the primary state is sensed and communicated to the controller (40).

15. The method according to claim 13, comprising the further step of:
   automatically activating the at least one robot milking station (1) when the secondary state is sensed and communicated to the controller (40).

16. The method according to claim 11, comprising the further step of:
   stopping the milk pump (4) of the at least one robot milking station (1) as a first measure of said measures when preparing the milking arrangement for the change of the state to a cleaning operation.

17. The method according to claim 11, comprising the further step of:
   closing a closing valve (42), provided on the milk conduit (6) downstream the at least one robot milking station (1) and upstream the outlet end (7), as a second measure of said measures when preparing the milking arrangement for the change of the state to a milking operation.

18. The method according to claim 17, comprising the further step of:
   evacuating the milk conduit (6) as a third measure of said measures when preparing the milking arrangement for the change of the state to a milking operation.

19. The method according to claim 12, comprising the further step of:
   closing a blocking valve (45), provided on the milk conduit (6) downstream the robot milking stations (1) immediately upstream the outlet end (7), as a fourth measure of said measures during moving the outlet member (9) of the connection conduit (8) from one of the first connection member (12) and second the connection member (22) to the other of the first connection member (12) and second the connection member (22).

20. The milking arrangement according to claim 1, wherein,
   the controller (40) communicates with the milk pump (4) of the at least one robot milking station (1) and to stop the milk pump (4) as a first measure of said measures when preparing the milking arrangement for the change of the state to a cleaning operation,
   the milking arrangement comprises a closing valve (42), communicating with the controller (40) and provided on the milk conduit (6) downstream the at least one robot milking station (1) and upstream the outlet end (7), and wherein the controller (40) is configured to close the closing valve (42) as a second measure of said measures when preparing the milking arrangement for the change of the state to a milking operation,
   the milking arrangement comprises an evacuating device (43), communicating with the controller (40) and provided on the milk conduit (6) downstream the closing valve (42) to evacuate the milk conduit (6), and wherein the controller (40) is configured to activate the evacuating device as a third measure of said measures when preparing the milking arrangement for the change of the state to a milking operation,
   the milking arrangement comprises a blocking valve (45) provided on the milk conduit (6) downstream the robot milking stations (1) immediately upstream the outlet end (7), and wherein the controller (40) is configured to close the blocking valve (45) as a fourth measure of said measures during moving the outlet member (9) of the connection conduit (8) from one of the first connection member (12) and second the connection member (22) to the other of the first connection member (12) and second the connection member (22),
   the sensor arrangement (30-32) is configured to sense the change in the state of the outlet member (9) of the connection conduit (8) and to communicate sensing of one of said primary state and said secondary state to the controller (40) such that the controller automatically activates the cleaning device (10) when the primary state is sensed and communicated to the controller (40) and automatically activates the at least one robot milking station (1) when the secondary state is sensed.

* * * * *